UNITED STATES PATENT OFFICE.

ERNST KAUDER, OF DARMSTADT, GERMANY.

PROCESS OF MAKING ALKYL ETHERS OF MORPHIN.

SPECIFICATION forming part of Letters Patent No. 626,910, dated June 13, 1899.

Application filed March 9, 1899. Serial No. 708,335. (No specimens.)

*To all whom it may concern:*

Be it known that I, ERNST KAUDER, a subject of the Emperor of Austria-Hungary, residing at Darmstadt, Grand Duchy of Hesse, Germany, have invented certain new and useful Improvements in Processes of Manufacturing Alkyl Ethers of Morphin, of which the following is a full, clear, and exact description.

My invention relates to an improved process for preparing alkyl ethers of morphin; and my object is to provide a still more economical method than hitherto used for preparing the same. This object I secure, preferably, by employing nitric-acid esters of those alkyls which it is desired to incorporate with the morphin as reagents in the preparation of ethers of morphin.

The preferred method consists in adding to an alcoholic solution of morphin the calculated amount of alkali or alkaline earth, (in the form of its metal or hydrate or alcoholate,) thus forming an alkaline solution of morphin, and then adding a nitric-acid ester of the desired alkyl likewise in quantity of one molecule. The reaction is completed by warming for a few hours on a water-bath, preferably in a reflux apparatus or under pressure, to a temperature approaching 100° centigrade. The isolation of the codein or other alkyl ether of morphin formed, as well as of small amounts of morphin which might have escaped the reaction, is then brought about according to known methods.

An actual example of the manufacture is as follows: One hundred parts, by weight, of morphin with eight hundred parts of alcohol (methylic, ethylic, or other) and 13.2 parts of sodium hydrate (or alcoholate) are made to form a solution, whereupon fifty-one parts of methyl nitrate are added thereto. The reaction may then be completed and the product isolated, as hereinbefore indicated.

It will be obvious that many changes may be made in the process herein disclosed without departing from the spirit of my invention.

What I claim as my invention is—

The process of preparing an alkyl ether of morphin which consists in acting, by a nitric-acid ester of the desired alkyl, upon a suitable alkaline solution of morphin.

Signed at Frankfort-on-the-Main, Germany, this 18th day of February, 1899.

ERNST KAUDER.

Witnesses:
RICHARD GUENTHER,
JEAN GRUND.